United States Patent [19]

Gulbrandsen

[11] Patent Number: 4,814,926

[45] Date of Patent: Mar. 21, 1989

[54] FLEXIBLE DISK CASSETTE

[75] Inventor: Richard Gulbrandsen, Beverly, Mass.

[73] Assignee: Polaroid Corporation, Cambridge, Mass.

[21] Appl. No.: 101,995

[22] Filed: Sep. 28, 1987

[51] Int. Cl.$^4$ .......................................... G11B 23/033
[52] U.S. Cl. ...................................... 360/133; 360/128
[58] Field of Search .................. 360/133, 132, 97, 99, 360/128; 206/444; 346/137

[56] References Cited

U.S. PATENT DOCUMENTS

| | | | |
|---|---|---|---|
| 3,975,768 | 8/1976 | Jacques et al. | 360/99 |
| 4,149,207 | 4/1979 | Porter, Jr. et al. | 360/133 |
| 4,152,740 | 5/1979 | Stratton | 360/133 |
| 4,301,486 | 11/1981 | Brown et al. | 360/99 |
| 4,445,155 | 4/1984 | Takahashi et al. | 360/99 |
| 4,466,037 | 8/1984 | Yoshida et al. | 360/133 |
| 4,510,546 | 4/1985 | Asami et al. | 360/133 |
| 4,517,617 | 5/1985 | Tsuji et al. | 360/133 |
| 4,549,922 | 10/1985 | Oishi et al. | 360/133 |
| 4,577,251 | 3/1986 | Okada | 360/133 |
| 4,626,949 | 12/1986 | Brock et al. | 360/133 |
| 4,660,117 | 4/1987 | Carey et al. | 360/133 |
| 4,688,129 | 8/1987 | Gruehn et al. | 360/133 |
| 4,734,815 | 3/1988 | Naganawa et al. | 360/133 |

FOREIGN PATENT DOCUMENTS

| | | | |
|---|---|---|---|
| 0101011 | 2/1984 | European Pat. Off. | 360/133 |
| 60-20374 | 2/1985 | Japan | 360/133 |

OTHER PUBLICATIONS

EPO Abstract, Apr. 8, 1987, No. 0217785.

Primary Examiner—John H. Wolff
Assistant Examiner—Matthew J. Bussan
Attorney, Agent, or Firm—John S. Vale

[57] ABSTRACT

A flexible disk cassette is provided and includes improved structure for stabilizing flutter of the disk upon rotation of the latter within the cassette, particularly at the access slot where the disk may be coupled to read/write heads for data recording or reproduction. The cassette includes a flexible data storage disk coated on both sides with a data storage recording medium and a pair of cleaning liners each positioned on a respective side of and in selective contact with the disk. The disk, sandwiched between the liners, is positioned in the cassette between a pair of spaced-apart covers bonded to one another. Respective radially extending access slots are provided in the covers to provide access of the read/write heads to the data storage medium on the disk. Positioned adjacent each radial edge of the access slot and facing the respective liner is a flat-surfaced, raised portion or land. Respective pluralities of spaced apart, radially extending ribs of uniform height are formed on the inside surface of each cover in opposed, interdigitated relation, the respective planes of the surfaces of each plurality of ribs being spaced apart to accommodate the liners and disk while positioning the liners in selective contact with the disk to effect stabilization while maintaining torque necessary to rotate the disk at an acceptable level.

26 Claims, 6 Drawing Sheets

FLEXIBLE DISK CASSETTE

BACKGROUND OF THE INVENTION

The present invention relates to a flexible disk cassette formed with a hollow housing of a relatively rigid material suitable for enclosing a thin flexible data storage or recording disk mounted for rotation within the housing. More particularly, the invention relates to such a disk cassette that includes means for stabilizing the motion of the flexible disk as the latter is rotated within the housing. The invention also relates to a disk having a novel hub or center plate structure, and a novel method of attaching the hub to the flexible disk.

Magnetic flexible or floppy disks are widely used as data storage media for computers because of their ease of handling and their relatively low cost. A floppy disk is a flexible disk, usually made of polyester resin and coated on both sides with a layer of a recording medium in which digital information can be recorded and/or retrieved by a read/write head or heads as the flexible disk is rotated by a disk drive.

While the present invention is primarily directed to magnetic recording disks, it should be understood that the inventive concepts described herein may be applied to other types of flexible disk cassettes wherein the disk recording medium embodies other recording techniques such as optical or magneto-optical recording.

Floppy disks of 5¼ inches or 8 inch diameter currently are contained in a flexible jacket formed with generally rectangular slots which serve as read/write head access windows, and with a center opening for engagement of the disk with a disk drive spindle. Presently there is a trend toward using microdisks that are 3½ inches in diameter. These latter disks are packaged in cassettes and usually are designed to provide a higher recording density. However, the increased recording density also substantially increases the disk cassette's vulnerability to drop out (i.e loss of data usually due to inability of the head to read from or write onto the disk) caused by disk instability at the head/medium interface (e.g. disk vibration or flutter) that may vary the intended head to disk spacing. This condition is particularly pronounced at disk rotation speed in excess, for example of about 600 rpm, that are desirable to increase data transfer rates.

Some existing designs provide a measure of contaminant protection to these smaller diameter microdisks by packaging them in a cassette or enclosure that is more rigid or durable than the traditional 5¼ inch or 8 inch floppy disk jacket. In addition, a displaceable shutter may be provided to keep dust and foreign matter from entering the enclosure through the magnetic head access windows when the cassette is not in a disk drive. These newer cassettes usually include flexible wiping liners or cleaning sheets often made of nonwoven material adhered to the inside of both halves of the jacket or enclosure to wipe any debris from the floppy disk as it is rotated by the disk drive. These liners also prevent abrading or wearing of the floppy disk by inside surfaces of the hard floppy disk enclosure. In such known designs, however, the nonwoven material may be torn by irregularities and burrs on the outer edge of the rotating disk, resulting in damage the material and production of debris.

For example, U.S. Pat. No. 4,445,155 discloses a magnetic disk cassette enclosing a floppy disk protected adjacent each recording face by a sheet of nonwoven fabric welded to the inside of the cover, the fabric serving to clean the recording surface. A similar structure is shown in U.S. Pat. Nos. 4,517,617 and 4,510,546.

The designs disclosed in the above-identified Letters Patents appear to have limited data density storage capacities and limited speeds for disk rotation, distinct disadvantages, believed in part, to be a result of insufficient stabilization, i.e. minimization of motion or flutter of the disk transversely to its mean plane of rotation, particularly at the head/medium interface, as the disk is rotated within the cassette at high angular velocities by the disk drive.

Some minor degree of stabilization has been achieved, as described in commonly assigned copending U.S. patent application Ser. No. 781,060 filed Sept. 27, 1985 by providing, on interior surfaces of the cassette covers, radially extending tapered ribs, angularly spaced apart and alternately interdigitated from cover to cover. Other designs have been suggested to provide stabilization for floppy disks in cassettes.

For example, U.S. Pat. No. 4,301,486 issued Nov. 17, 1981 to S. H. Brown, et al discloses a recording cartridge containing a floppy disk, at least one side of which is coated with a magnetic flux-responsive material. One of the walls of the cartridge contains an access slot for a magnetic reading head. Disposed about the access slot is a raised portion having a large radius of curvature relative to the size of the disk. The raised portion is provided to cause the disk, upon rotation, to conform to the curvature thereby adding stability to the disk to maintain appropriate head-to-disk contact, and also to cause the disk to conform more readily to the curvature of the head for more effective transfer of information signals. The opposite surface of the interior of the cartridge is provided with a plurality of hump-shaped members which are alleged to exert aerodynamic pressure on the opposite side of the disk to bias it toward the magnetic head. These hump-shaped members are coated with conductive material so that upon direct contact with the underside of the disk, they drain off electrostatic charge during system operation. No provision is made to provide any cleaning sheets for the recording surface.

In U.S. Pat. No. 3,975,768 issued Aug. 17, 1976 to J. O. Jacques, et al., there is shown a cartridge containing a disk. The inside bottom of the cartridge has radially extending and circumferentially spaced ribs as well as circumferentially extended rib segments, all to assist in causing the disk to fly within the apparatus on an air film between the bottom of the cartridge and a head plate having a number of read/write transducers. No cleaning liner sheet is disposed adjacent the recording surface of the disk.

A principal object of the present invention is to provde a flexible disk cassette that allows the disk to be rotated at high speed and yet remain stabilized with respect to its intended mean plane of rotation.

A further object of the present invention is to provide a flexible disk cassette that allows its flexible disk to be sufficiently stable in operation to be able to provide increased data storage capacities.

Yet another object of the present invention is to provide a flexible disk cassette that will stabilize disk movement transverse to the mean plane of flexible disk rotation at the head/medium interface where the head or heads and the rotating disk interface with one another to effect data recording and/or playback.

Yet an additional object of the present invention is to provide a flexible disk cassette that reduces fluttering in the area or areas at which the rotating disk and head or heads interact with one another.

Another object of the present invention is to provide a flexible disk cassette in which means for enhancing the cleaning function of a liner located within a disk cassette will also aid in stabilizing the disk.

An additional object of the present invention is to provide a flexible disk, such as a magnetic disk, that includes a hub or center plate and connection thereto which allows the disk to be rotated at high speeds, while remaining stabilized.

Yet another object of the present invention is to provide a method of securing a flexible disk to a center plate or hub that is simple, economical and effects an accurate positioning of the disk on the plate.

Yet a further object of the present invention is to provide a method of making a flexible disk cassette which method results in a realization of the foregoing objects.

SUMMARY OF THE INVENTION

To effect the foregoing and other objects, the present invention is typically embodied in a flexible disk cassette that includes a substantially rigid, hollow, enclosure having a pair of covers having substantially parallel, flat, spaced-apart internal surfaces. Mounted for rotation on a hub or center plate and between those internal surfaces is a flexible disk, the latter typically having data recording medium such as a magnetic or other type of recording layer coated or otherwise disposed on both sides thereof. Corresponding nonwoven, flexible fabric liners are provided adjacent the coated disk sides, the liners and disk being sandwiched between the pair of internal surfaces of the enclosure. At least one cover includes a central aperture through which a drive spindle can engage the disk hub from outside of the enclosure. Both covers typically also include access slots or windows through which read/write heads can access the disk to enter and/or retrieve data onto and-/or from the recording medium coated on the disk, the access slots being congruent or registered with one another on opposite sides of the cassette.

Stabilizing means are provided within the cassette, and includes one or more raised pads or lands disposed on the internal surfaces of the cassette adjacent at least both the upstream and downstream edges of the slots (with reference to the direction of rotation of the disk past the slots). The pads or lands define opposed, spaced-apart surface portions that cooperate with the liner sheets to substantially limit rotation of the disk to substantially the mean plane of disk rotation in the area of the slot and thereby limit motion of the disk transversely to that mean plane in the area of the slots. Additionally, stabilization is also aided by the inclusion of respective first and second pluralites of generally radially extending ribs of substantially uniform height preferably formed respectively on the opposed internal surfaces of each of the covers in an interdigitated relation. Each of the first plurality of ribs are angularly spaced at substantially equal angular distances from one another. The individual ribs of the second plurality are also equiangularly spaced and are positioned, when the covers are assembled, so that each rib of the first plurality of ribs is positioned between a pair of ribs of the second plurality.

When the magnetic disk cassette is fully assembled such that the magnetic disk and respective adjacent liners are positioned between the cassette covers, the projecting inwardly directed faces of the opposed ribs engage and hold the respective liner adjacent the corresponding disk surface to enhance the cleaning function of the liner and to provide some additional stabilization. Major stabilization, however, is provided by the pads or lands disposed adjacent the radial sides (with respect to the center of the disk of the read/write access slot or slots.

In another aspect, the present invention can be seen as a combination of the above-described improved disk cassette structure and the disk hub structure for improving disk performance at speeds in excess of 600 rpm and, in preferred embodiments, at substantially 1200 rpm.

Other objects of the invention will in part be obvious and will in part appear hereinafter.

The invention accordingly comprises the apparatus and metho possessing the construction, combination of elements and arrangement of parts, and the process comprising the several steps and relation of one or more of such steps with respect to each of the others, all of which are exemplified in the following detailed disclosure and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENT

FIGS. 1 through 4 inclusive are exemplary of disk cassette 20 embodying the principles of the present invention. Cassette 20 includes a substantially rigid flat hollow enclosure formed from a pair of covers 22 and 24, both shown in detail in FIGS. 2A and 2B. Each of covers 22 and 24 have a substantially flat interior surface, designated 54 and 68 respectively.

Figure 1:
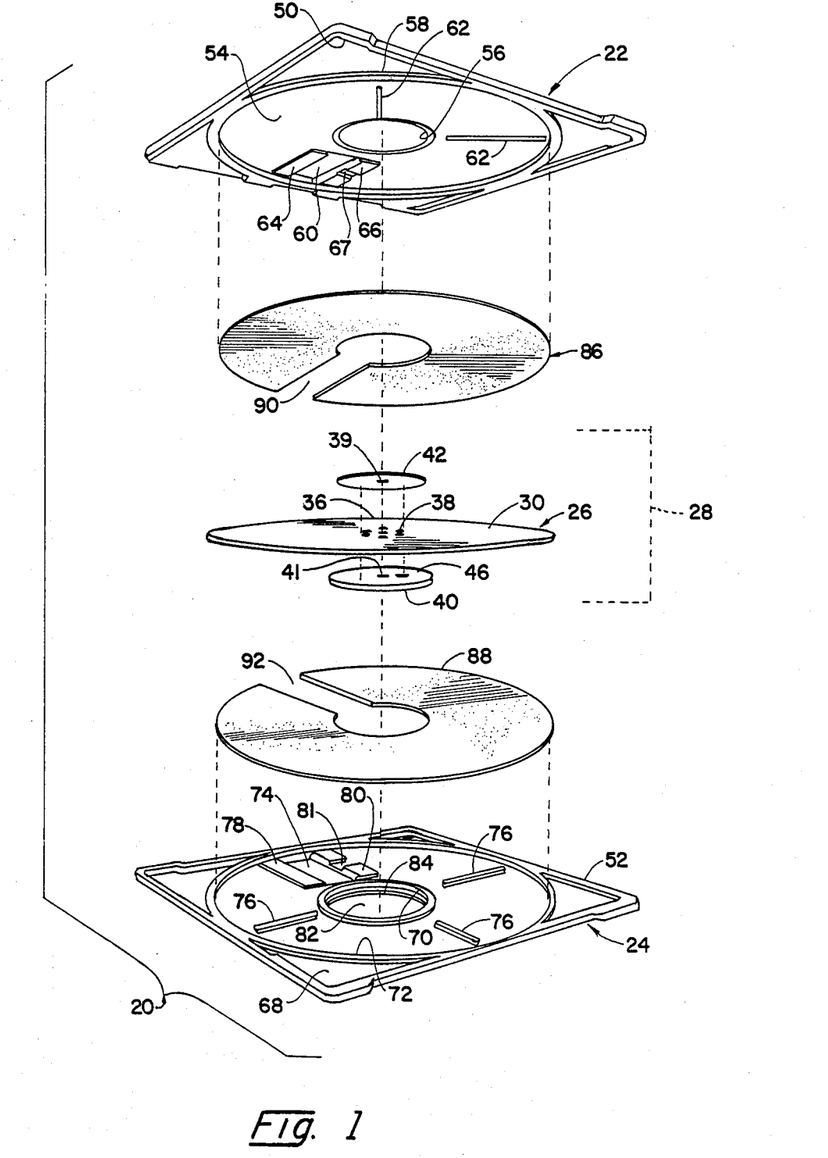
FIG. 1 is an exploded perspective view of the elements of a flexible disk cassette incorporating the principles of the present invention.

Cassette 20 includes circular, flexible or floppy magnetic disk 26 mounted on hub 28. The disk typically is formed, as wel known in the art, of a thin (e.g. 0.003 inches), flexible, circular base of polymeric film. Respective magnetic recording layers 30 such as barium ferrite, gamma ferric oxide or the like are coated on opposite sides of the disk to form respective data recording layers. Typically, data is recorded in tracks on each side within an annular recording zone about ¼ inch in radial width from edge to edge and lying intermediate the inner and outer peripheries of the disk.

Disk cassette 20 is designed to stabilize the rotational characteristics of disk 26 at relatively high rotational speeds consistent with desired data transfer rates. For example, in the illustrated embodiment, disk 26 is 3.5 inches in diameter. The preferred magnetic recording material (e.g. barium ferrite) coated onto disk 26 provides a linear bit density in the range of 40,000 flux changes per inch. To provide relatively high storage capacity, disk 26 is preferably formatted to record data at approximately 540 tracks per inch. This combination of linear bit density and track density provides disk 26 with a storage capacity of approximately 10 megabytes per side or 20 megabytes per disk for double sided recording. It is also highly desirable to operate such a disk at a relatively high data transfer rate of, for example, approximately 5 megahertz, or 5 million flux transitions per second, which requires a disk in this format to be rotated past magnetic read/write heads at approximately 1200 rpm.

To achieve relatively high track densities (for example above 300 tpi) on a flexible disk which tends to undergo anisotropic dimensional changes in response to temperature and humidity variations, the disk and drive system may be designed to include a servo system for accurately positioning and maintaining the head over a selected data track.

In one type of servo system, track position signals are generated from information on the magnetic disk. These may be magnetic servo signals derived from magnetic signals recorded on the disk or optical servo signals derived from an optical pattern formed on the disk. The cassette embodying the present invention is especially well suited for use with the optical servo signal type because it substantially improves the stability of the rotationg disk making it much easier for an optical sensor in the drive to be maintained in operative relation to the optical servo pattern on the disk.

For an example of a magnetic recording system using disks having an optical servo signal generating pattern thereon, see commonly assigned, copending application U.S. Ser. No. 892,527 filed on Aug. 21, 1986 by V. E. Ford et al for "Magnetic Recording Media and Servo Systems for Same," said application being incorporated by reference herein.

By way of comparison, commercially available 3.5 inch flexible disk cassettes typically are formatted for 135 tracks/inch operation and depending on the linear bit density of the magnetic layers, are designed to have a storage density of 0.5 to 1.0 megabytes per side. Generally, these disks are operated at either 300 or 600 rpm which sets the data transfer rate at either 0.25 or 0.50 megahertz.

Because the disk cassette of the present invention is intended to operate at higher bit density levels and at higher rotational velocity, the disk stability at the head/medium interface is much more critical to error-free, high speed data transfer.

The center of disk 26 is provided with circular aperture 36 surrounded by a plurality of perferably equiangularly spaced-apart additional apertures 38 arranged so that their centers lie on a circle concentric with aperature 36. In the illustrated embodiment, there are six such additional apertures 38, but disk 26 may be modified to have fewer or more as desired. Hub 28 is formed of a thin, circular plate or washer 40 (about 0.05 inches thick and having a diameter of about 1.098 inches) having central circular aperture 41 of substantially the same diameter as aperture 36, washer 40 being positioned on one side of disk 26 with apertures 36 and 41 concentrically registered. Hub 28 also includes a thin (e.g. 0.1 mm), flexible, flat ring 42, preferably of Mylar or other strong polymeric sheet material, having central aperture 39 the internal and external diameters of ring 42 having about the same diameters as washer 40. Ring 42 is coated on one side with a pressure-sensitive adhesive. Ring 42 is disposed on the other side of disk 26 concentrically with aperture 36, with the presure-sensitive adhesive side in contact with disk 26 and extending across each of the additional apertures 38. Thus, ring 42 adheres to both disk 26 and through apertures 38 to washer 40 to lock the latter to disk 26. It will be seen that the simple combination of flexible adhesive ring 42 and washer 40 can readily be assembled to form hub 28 with precise concentricity of hub and disk centers assured by the use of automatic placement equipment or jigs. The hub 28 so formed can be smaller in diameter than certain hubs in the prior art (e.g. the metal hub in a Sony 3.5 inch disk has a diameter of about 1.220 inches), so that the disk can be less stiff (or more flexible), near or at the innermost recording track, a desirable trait that provides less variation in disk flexibility characteristics over the span of the recording zone and promotes better inner track recording.

Figure 3:
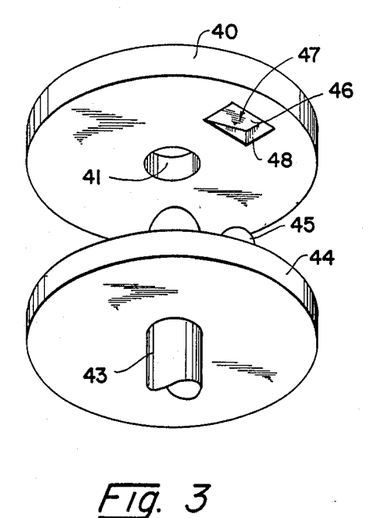
FIG. 3 an exploded perspective view, partially cut away, of the mating surface of a standard disk drive spindle and the hub plate of the disk of FIG. 1.

Aperture 41 in washer 40 is preferably dimensioned to provide a tight fit for the usual motor shaft 43 in a standard disk drive. Such shafts typically have a circular plate 44 so fixed adjacent the end of the shaft, that tip 49 of shaft 43 protrudes through and extends from the other side of plate 44 for entry into aperture 41. Plate 44 also mounts, on the same side as tip 49, a spring-loaded, roller-bearing drive pin 45 at a radially offset position from the shaft axis. Pin 45 is biased by its spring so as to normally protrude outwardly from plate 44 and is mounted so as to be axially displaceable in a direction parallel to the axis of shaft 43. Consequently, washer 40 also includes slot 46 similarly offset radially from the center of the washer, slot 46 having entrance ramp 47 extending at an acute angle (i.e. 15°) downwardly from the outer surface of washer 40 along a tangent to the circumference of the washer. Opposite ramp 47, slot 46 is formed with an abrupt abutment or wall 48. Thus, when tip 49 of central shaft 43 of the disk drive is engaged in aperture 41, the retractable drive pin 45 of the disk drive can move down ramp 47 into slot 46 and engage wall 48 to drive the disk.

As noted above, to form an enclosure about disk 26, the cassette includes a pair of covers 22 and 24, typically injection-molded, ABS resin, rectangular plates each having a respective peripheral upstanding wall 50 and 52 intended to be coupled with the corresponding wall of the other cover so as to define a thin rectangular space in which disk 26 is disposed. Covers 22 and 24 may be joined to one another at mated walls 50 and 52 by any of a number of known techniques such as adhesion, ultrasonic welding or the like.

Figure 2A:
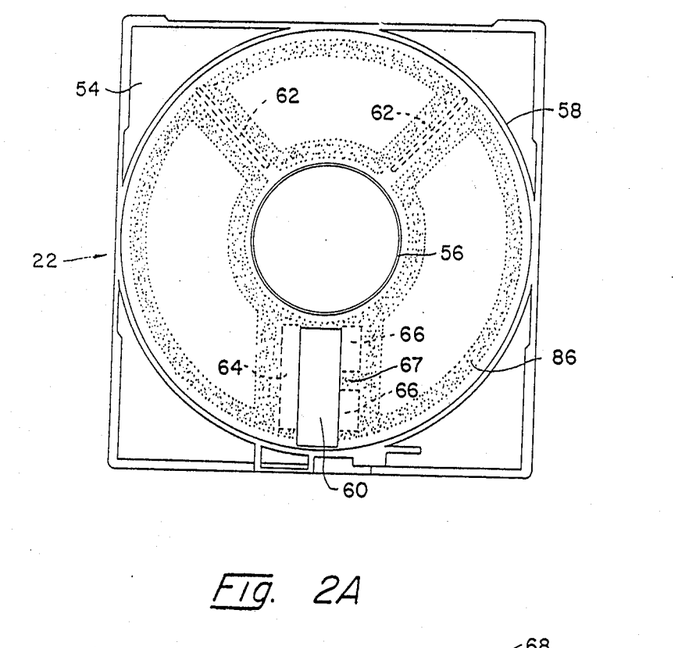
FIG. 2A is a interior plan view of the cassette covers of FIG. 1.

Interior surface 54 of cover 22 is substantially planar and is provided with a central, closed bottom well 56 having a circular wall 56a with a diameter slightly greater than the diameter of ring 42 so that the latter can readily fit within well 56. The bottom of well 56 is formed with a pressure and/or wear pad 57 intended to cooperate with tip 49 of shaft 43 as will be hereinafter described. Another circular wall 58, slightly larger than the diameter of disk 26, is disposed on surface 54 concentrically with the wall of well 56. Walls 50 and 58 are preferably flat-surfaced and are of uniform height above the plane of surface 54, well wall 56a, however, being of considerably less height. Wall 58 particularly serves as stiffening means to aid in maintaining the flatness of cover 22.

Cover 22 is also provided with access slot 60, typically rectangular, extending through the cover 22 radially with respect to the circular configuration of well 56 and for a distance sufficient to expose the recording zone of medium 30 when disk 26 is centered with respect to well 56. To this end, slot 60 extends radially from the inside edge of wall 58 to about 0.12 inch from the outer edge of well 56.

Means for stabilizing the rotation of disk 26 are provided and may include a plurality of elongated ribs 62 distributed radially about well 56, spaced angularly from one another and from the radial centerline axis of slot 60. Ribs 62 extend across surface 54 between well 56 and wall 58 but the ends of ribs 62 are spaced apart from well 56 and wall 58.

In the illustrated embodiment, cover 22 is provided with two such ribs 62 angularly spaced at 90° with respect to each other and at 135 degrees with respect to the radial axis of slot 60.

The more important aspect of the stabilizing means of the present invention comprise means, in the form of raised lands 64 and 66, disposed on internal surface 54 adjacent each radial edge of access slot 60, defining a pair of raised surfaces parallel to surface 54. In the embodiment shown, ribs 62 rise perpendicularly from the plane of surface 54 a substantially uniform distance, less however than the height of walls 50 and 58. Lands 64 and 66 are also limited in radial length, extending preferably the full radial length of slot 60, i.e. from the end of slot 60 adjacent but spaced from well 56 to a position well-spaced from wall 58. While land 64 adjacent the upstream (with reference to the expected direction of rotation of disk 26 past slot 60) edge of slot 60 can provide a single surface raised above and parallel to surface 54, it is preferred, for reasons that will be apparent hereinafter that land 66 positioned along the downstream edge of slot 60 be split by groove 67 in the direction of rotation of disk 26.

Figure 2B:
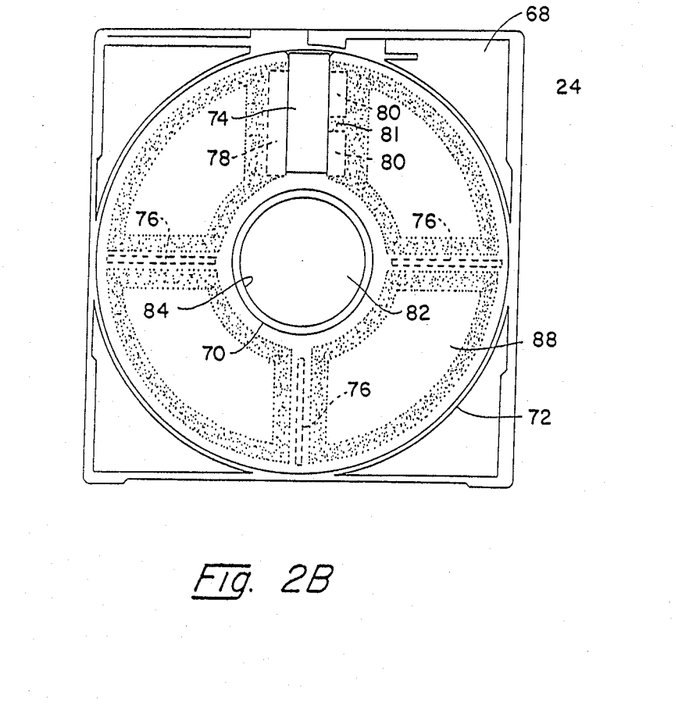
FIG. 2B is an interior plan view of the other of the cassette covers of FIG. 1.

Cover 24 is similarly provided with an interior surface 68 that is substantially planar and is provided with a central well 70 for receiving washer 40, well 70 being defined by a circular wall 70a of the same diameter as wall 56a. Another circular wall 72 is provided on surface 68 identical in dimensions to wall 58, and is intended to provide stiffening for cover 24. Cover 24 is similarly provided with a rectangular head access slot 74 extending through the cover and being in all respects substantially identical to access slot 60, the two access slots being in registration with one another when covers 22 and 24 are joined.

Distributed radially about well 70 and spaced angularly from one another and from the radial axis of slot 74 is another plurality of radially extending enlongated ribs 76. In the illustrated embodiment, cover 24 is provided with three such ribs 76, two being angularly spaced at 90 degrees with respect to the radial axis of slot 60 and the third at 180 degrees with respect to the radial axis so as to position ribs 76 in opposed interdigitated relation with the ribs 62 when the covers 22 and 24 are joined to form the cassette housing.

Positioned adjacent each radial edge of access slot 74 are means, shown as lands raised 78 and 80, defining a pair of raised surfaces parallel to surface 68 and similar in size and position to lands 64 and 66. Again, land 80, the downstream land, has groove 81 intermediate its radial ends while the upstream land 78 does not include such a groove.

In the illustrated embodiment, the ribs 62 and 76 have a radial length of about 0.878 inches and a width of about 0.031 inches. The upper inwardly facing surfaces of ribs 62 and 76 are substantially flat, and when covers 22 and 24 are joined together at walls 50 and 52, the upper inwardly facing surfaces of ribs 62 lie in a plane spaced from a similar plane defined by the opposed surfaces of ribs 76 by a distance of approximately 0.0174 inches, these planes being symmetrically disposed and equally spaced from the intended mean plane of disk rotation therebetween. Ribs 76 are distributed, however, such that when covers 22 and 24 are properly joined together (i.e. with slots 74 and 60 registered), ribs 76 are interdigitated with respect to ribs 62, i.e. they extend radially substantially intermediate respective pair of ribs 62.

In the embodiment shown, the radial length of the upstream lands 64 and 78 is about 0.850 inches and the width is about 0.158 inches. The downstream lands 68 and 80 have about the same overall dimensions but are divided by the respective slots 67 and 81 which measured about 0.126 inches in the radial direction.

The upper inwardly facing surfaces of lands 64 and 66 are preferably flat and lie in a plane spaced typically 0.005 inches further away from the mean plane of disk rotation than the plane defined by the surfaces of ribs 62. The upper inwardly facing surfaces of lands 78 and 80 lie in a plane that is similarly 0.005 inches further away from the mean plane of disk rotation than the plane defined by the surfaces of ribs 76. Viewed in another way, there is about 0.010 inches more spacing between the opposed lands than there is between the opposed ribs. Thus, the lands are symmetrically disposed on opposite sides of the intended mean plane of disk rotation with each set of lands being spaced about 0.0135 inches therefrom to provide a space of about 0.027 inches between the opposed and aligned corresponding lands.

It will be appreciated that the upper surfaces of the lands protruding from covers 22 and 24 adjacent slots 69 and 74 need not be shaped as hereinbefore described but can assume a variety of forms. For example, the inner surfaces of the lands facing the disk may be crowned or slightly convex rather than flat, and the land themselves may be formed of several sections separated from one another by slots or depressions.

Well 70 in cover 24 includes concentric circular aperture 82 therein of sufficiently lesser diameter than the internal diameter of well 70 so that a narrow ring or counterbore 84 is formed below surface 68 and extending around the internal periphery of well 70. Upon placement of disk 26 in cover 24, the outer edge of the flat surface of washer 40 rides on and is rotatably supported by counterbore 84, aperture 82 being of sufficient diameter however, to permit coupling of drive spindle tip 49 and pin 45 respectively with aperture 41 and drive slot 46. It will be apparent that counterbore 84 serves to confine washer 40 so that it cannot move substantially out of concentricity and also to hold the washer axially against disk 26, preventing peel-off.

The stabilization means of the present invention also comprise a pair of flexible cleaning liners 86 and 88, typically forced as centrally apertured flat disks of non-woven fabric such as rayon and the like. Liners 86 and 88 are respectively dimensioned to fit within the interior edges of circular walls 58 and 72 and centrally about wells 56 and 70. Liners 86 and 88 are typically 7 mil inches thick. Each of liners 86 and 88 are provided with respective radial slots 90 and 92 extending from the central aperture of the respective liner to its peripheral edge. Each of slots 90 and 92 have substantially the same width as the width of the corresponding access slots 74 and 60 in respective covers 22 and 24, and the cut out slots 90 and 92 are provided to unblock the access slots.

Liners 86 and 88 not only comprise part of the stabilizing means of the present invention, but also serve as cleaning tissues for removing dust or debris from the surfaces of recording disk 26, thereby preventing drop-out and damage to the coatings by the ribs and the lands as disk 26 is rotated within the covers by the drive shaft. Liners 86 and 88 have diameters slightly less than that of disk 26 so that during rotation of disk 26 in cassette 20, the outer edge of disk 26 cannot contact either liner 86 or 88, thereby avoiding tearing or damaging the liners by burrs that may be formed on the outer edge of the disk during the manufacturing of the disk, particularly by punching the disk out of a web. The lines have certain portions thereof attached to the corresponding internal surfaces 54 and 68 to prevent the lines from rotating with the disk 26.

As shown particularly in stippling in FIGS. 2A and 2B, liners 86 and 88 are bonded about their external and internal peripheries to respective surface 54 of cover 22 and surface 68 of cover 24, typically by ultrasonic welding. In addition, liner 86 is similarly bonded to surface 54 on both sides of each of rib 62 and also to surface 54 adjacent the long edges of lands 64 and 66 except at those edges immediately adjacent access slots. Importantly, bonding is also provided between liner 86 and surface 54 along groove 67 between the portions of land 66. The welding of the liner in groove 67 on the downstream side of slot 60 prevents the liner from being lifted from surface 54 by the sliding motion of disk 26 over liner 86 during disk rotation. Liner 88 is bonded to surface 68 in a manner similar to the bonding of liner 86 to surface 54. Importantly also, it will be seen that care should be taken to avoid bonding liners 86 and 88 to the inwardly facing surfaces of any of the ribs or lands, thereby avoiding creating irregular discontinuities on these surfaces of either the ribs or lands and/or the respective conforming liners, which discontinuities can cause damage to the recording surfaces of the disk. Thus, the liners have unattached portions overlying the ribs and lands.

Figure 4:
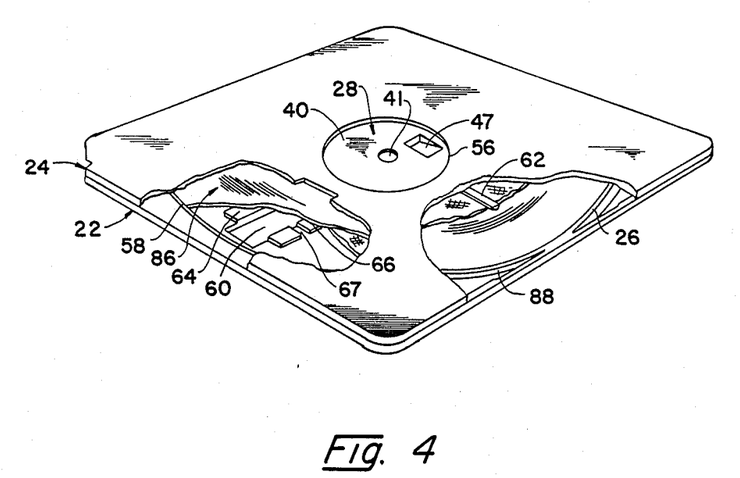
FIG. 4 is a perspective view, partially cut away, of the assemled disk cassette of FIG. 1.

As shown particularly in FIG. 4, the cassette is assembled by bonding the attached portions of liners 86 and 88 to the interior surfaces respectively of covers 22 and 24, with slots 90and 92 in the liners being registered with respective head access slots 74 and 60 in the covers. The central aperture of liner 86 is positioned around well 56, and the central aperture of liner 88 is similarly positioned about well 70. Disk 26 is emplaced so that washer 40 is held in counterbore 84. Portions of walls 50 and 52 are bonded to one another so that disk 26 extends in a plane lying between the respective liners 86 and 88 covering the interdigitated ribs of covers 22 and 24 and the lands, and is held lightly by and between the liners.

When the cassette is placed in the disk drive of a data recording/reproduction system, tip 49 of shaft 43 will extend far enough through central aperture 41 of hub 28 so that tip 49 will contact and ride on pressure pad 57, thus insuring that cover 22 will not bow inwardly toward disk 26. Also when the cassette is in the data recording/reproduction system, as is well known, one or more magnetic heads are brought into operative relation with recording layers 30 on opposite sides of the disk through head access slots 60 and 74.

Ribs 62 and 76 serve to hold each of liners 86 and 88 against opposite sides of disk 26 to aid the cleaning function of the liners as disk 26 rotates within cassette 20. Ribs 62 and 76, in combination with liners 86 and 88, also impose a light drag on the rotation of disk 26 in a direction opposite to the force provided by the disk drive. It will be appreciated that a flexible disk, upon rotation in its own plane, will inherently exhibit some flutter (motion of portions of the disk transversely to its mean plane of rotation). Raised lands 64 and 66 on cover 22 and 78 and 80 on cover 24 in combination with liners 86 and 88 serve to sharply reduce such flutter. With respect to the raised lands, they serve to locate that portion of the liners overlying the lands in position to limit rotation of the disk to substantially the mean plane of disk rotation in the area of the access slots. The combination of ribs 62 and 76, raised lands 64 and 66 of cover 22, raised lands 78 and 80 of cover 24, and liners 86 and 88 provide greater disk stabilization particularly with respect to those portions of the disk traversing the area defined by access slots 60 and 74; such stabilization of disk movement transverse to the plane of rotation is believed to occur because this combination of elements defines a selectively narrower passageway in which the disk can rotate within strategic points in the cassette. Should however the areas of the upper inwardly facing surfaces of the ribs and lands be increased substantially, it possibly will result in increasing the area of liner contact with the disk surfaces thereby raising to unacceptable levels the torque required to rotate the disk.

It will also be appreciated that the cassette of the present invention has been shown and described, for purposes of simplicity in exposition, without inclusion of a number of desirable items well known in the art. For example, the cassette should include a slidably displaceable cover over the head access slots to protect the latter when the cassette is not in a disk drive mechanism, but which will be automatically diplaced by insertion of the cassette into such a disk drive mechanism to permit access by read-write heads to the recording medium on the disk. Similarly, the outer surface of the cassette may bear aids for positioning the cassette in a disk drive mechanism or for locking the cassette in a fixed position when in such mechansim.

Figure 5:
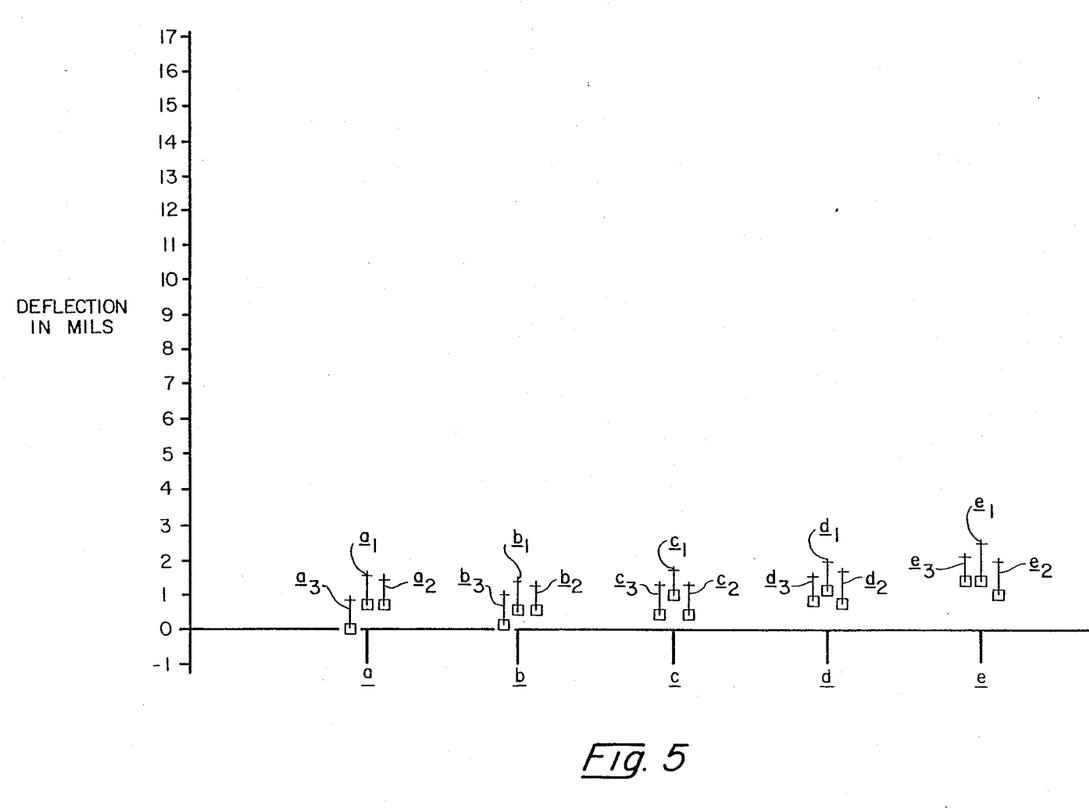
FIG. 5 is a graphical representation of experimental data relating to deflection of the flexible disk in a cassette, constructed in accordance with the principles of the present invention, on rotation of the disk at 1200 rpm.
Figure 6:
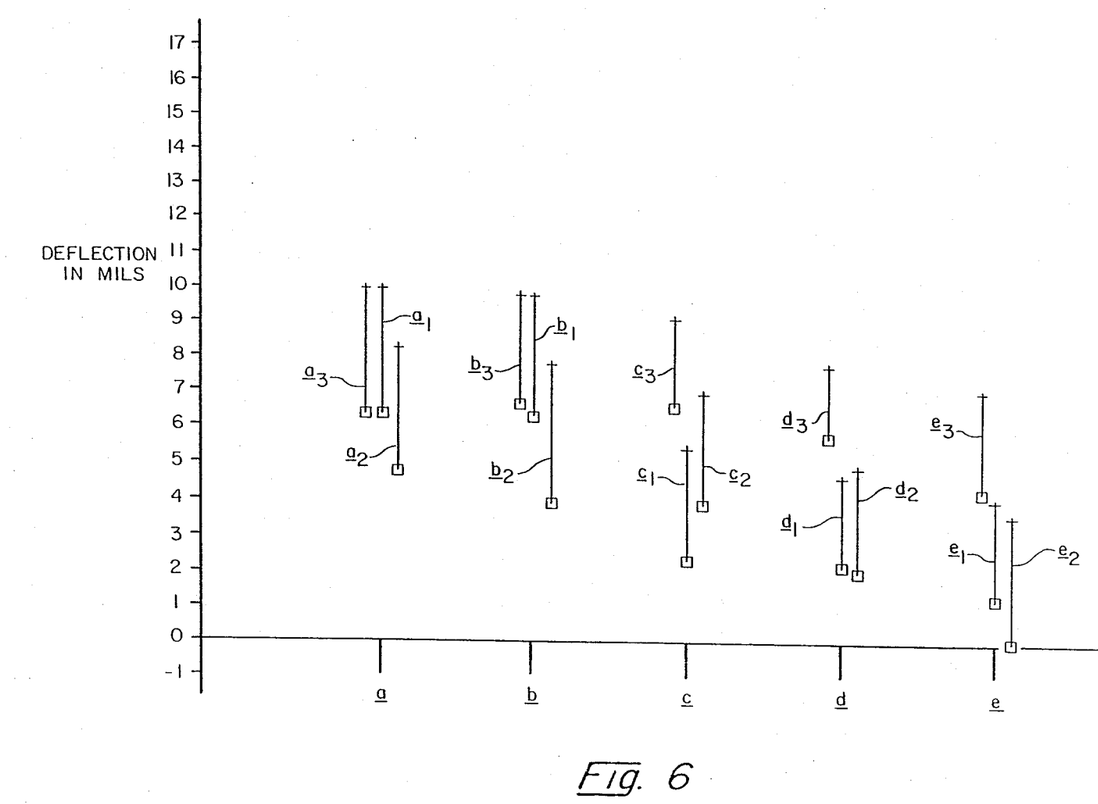
FIG. 6 is a graphical representation of experimental data relating to deflection of a flexible disk in a commercially available type of cassette upon rotation of the disk at 1200 rpm.

The extent of stabilization achieved by a disk cassette embodying the principles of the present invention as illustrated in FIGS. 1 through 4 inclusive, was determined by measuring the transverse deflection of disk 26 from a mean plane of rotation in a prototype cassette as the disk passed access slots 60 and 74 while being rotated at 1200 rpm. By way of comparison, a conventional microcassette of the type available under the designation OM-D 3440 from Sony Corporation, and having a data disk of similar dimensions to the prototype above mentioned, was rotated also at 1200 rpm. In both cases deflection measurements were made at 15 corresponding points beneath the respective access slots of the two cassettes. FIGS. 5 and 6 graphically illustrate the results of these measurements.

In each of FIGS. 5 and 6 the zero point on the ordinate represents the deal or mean plane of rotation (i.e. without deflection) of a flexible disk, the ordinate being scaled in mil inches. The abscissa in each of these figures represents points "a" through "e" chosen at different radial positions across the recording zone on the disk from an innermost position, represented by "a", on the innermost data track to an outermost position, represented by "e", on the outermost data track. Measurements of disk deflection perpendicuarly or transverse to the mean plane of rotation of the disk were made at three different locations distributed perpendicularly to the central radial axis of each access slot at each of positions a, b, c, d and e. In FIGS. 5 and 6, the subscripts 1, 2 and 3 appended to each of positions a, b, c, d and e, respectively indicate that the locations were on the central radial axis of the slot, to the right or on the downstream side of the radial axis and to the left or upstream side of the radial axis. The upper bound of each measured deflection is identified in each of FIGS. 5 and 6 by a cross, the lower bound by a square. As will be seen in FIG. 6, in a conventional cassette, the range of the deflection being as much as 10 mil inches while the minimum deflections, which occurred particularly adjacent the outer track, ran from about 4 to 7.5 mil inches. In contrast, as shown in FIG. 5, in operation of the stabilized disk of the present invention, the disk deflections were markedly reduced, the range of deflections being about 1 to 1.5 mil inches while the maximum deflection at any location was about 2.5 mil inches. Of interest is that minimum deflections here occurred toward the inner edge of the disk rather than the outer edge as in the prior art. The deflections experienced in testing the disk in the prototype cassette of the present invention as shown in FIG. 5, are clearly more uniform across the radially extending recording zone than the deflections of the disk in the prior art cassette as shown in FIG. 6, indicating superior stabilization.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A flexible disk cassette comprising:
    a flexible data recording disk;
    a pair of substantially rigid covers joined in facing relation, with said disk therebetween, to form a disk enclosure having a pair of spaced apart, substantially flat and parallel internal surfaces between which said disk is disposed for rotation about an axis substantially perpendicular to said internal surfaces in a mean plane of rotation spaced from and substantially parallel to said internal surfaces, each of said covers having an access slot therein extending through its said internal surface for providing access to opposite surfaces of said disk for data recording and/or reading purposes, each of said access slots being disposed in registered relation to said access slot in the other cover and having upstream and downstream edges with reference to the direction of disk rotation past said access slots;
    a pair of flexible disk cleaning liners, each of said liners being disposed in said enclosure between one of said internal surfaces and an adjacent surface of said disk and having portions thereof attached to its adjacent internal surface to preclude rotation with said disk, and selected unattached portions thereof adapted to be disposed in wiping contact with the adjacent one of said disk surfaces, said liners each having a cut out portion for unblocking a corresponding one of said access slots; and
    means for stabilizing disk movement transverse to said mean plane of disk rotation as said disk rotates including substantially rigid raised lands on each of said internal surfaces adjacent said upstream and downstream edges of said access slots for locating corresponding unattached portions of each of said liners located over adjacent ones of said lands in position to limit rotation of said disk to substantially said mean plane of rotation in the area of said access slots.

2. The cassette of claim 1 wherein said stabilizing means further includes at least one substantially rigid, radially extending, raised rib on each of said internal surfaces of said enclosure for urging overlying unattached portions of adjacent ones of said liners into wiping contact with the disk surface adjacent thereto, said ribs being angularly offset with respect to each other and being dimensioned to project further inwardly toward said mean plane of disk rotation than said raised lands.

3. The cassette of claim 2 wherein one of said internal surfaces has two angularly spaced ribs thereon, and the other of said internal surfaces has three angularly spaced ribs thereon disposed in opposed interdigitated relation with respect to said two ribs on said one internal surface.

4. The cassette of claim 3 wherein said access slots are radially extending slots, said two ribs on said one said internal surface are each angularly offset about 135 degrees with respect to a radial centerline of said access slots, and two of said ribs on said other internal surface are each angularly offset about 90 degrees with respect to said centerline and said third rib is offset about 180 degrees with respect to said centerline.

5. The cassete of claim 2 wherein said ribs are dimensioned to have a constant height along their length and inwardly facing surfaces of ribs on the opposite internal surfaces respectively lie in planes that are spaced apart in a direction normal to said internal surfaces by a distance that is substantially equal to the combined thickness of said disk and said pair of liners.

6. The cassette of claim 5 wherein said lands are dimensioned to have a constant height along their length and inwardly facing surfaces of lands on the opposite internal surfaces respectiely lie in planes that are spaced apart in a direction normal to said internal surfaces by a distance that is about 0.010 inches greater than the combined thickness of said disk and said pair of liners.

7. The cassette of claim 6 wherein said planes containing said inwardly facing surfaces of said ribs are symmetrically disposed on opposite sides of said mean plane of disk rotation.

8. The cassette of claim 7 wherein said planes containing said inwardly facing surfaces of said lands are symmetrically disposed on opposite sides of said mean plane of disk rotation.

9. The cassette of claim 1 wherein said flexible disk is attached to a central hub, and one of covers has an opening therein providing access for external disk drive means to engage said hub and effect disk rotation.

10. The cassette as defined in claim 9 wherein said flexible disk includes a central aperture surrounded by a plurality of secondary apertures, and said hub comprises a flexible ring having an adhesive surface and a substantially rigid circular plate, said flexible ring being positioned coaxially with respect to said central aperture by coupling said adhesive surface to one surface of said flexible disk and being dimensioned to extend over said secondary apertures, said rigid circular plate being positioned on the other surface of said flexible disk coaxially with said central aperture and being adhesively coupled to said adhesive surface of said flexible ring through said secondary apertures so as to be retained against said other surface of said flexible disk.

11. The cassette as defined in claim 10 wherein said rigid circular plate includes a central hole dimensioned to accept a spindle shaft of a disk drive.

12. The cassette as defined in claim 11 wherein said rigid circular plate has a driving slot offset from said central hole, for accepting an offset drive pin coupled to said spindle shaft.

13. The cassette as defined in claim 12 wherein said driving slot includes first and second radial edges, and comprises at said first radial edge a ramped portion extending substantially normally to said first radial edge and downwardly at an angle from the exterior flat surface of said rigid circular plate, and comprises at said second radial edge an abutment with which said drive pin can engage.

14. The cassette as defined in claim 10 wherein one of said flat internal surfaces has a first central well formed thereon for receiving said rigid circular plate of said hub of said flexible disk, said first well being defined by a first circular wall for restrainnig motion of said rigid circular plate perpendicularly to the axis of rotation of said flexible disk in said mean plane and having an internal diameter greater than the diameter of said circular plate, and a centrally apertured concentric counterbore within said first circular well for restraining axial motion of said rigid circular plate and having an internal diameter less than the diameter of said circular plate.

15. The cassette as defined in claim 14 wherein the other of said flat internal surfaces has a second central well-formed thereon for receiving said flexible ring on the other side of said flexible disk, said second well being defined by a second circular wall opposed to and having substantially the same dimensions as said first circular wall.

16. The cassette as defined in claim 15 including third and fourth circular shaped walls for imparting stiffness to said enclosure, each of said walls having an internal diameter greater than the diameter of said flexible disk, said third wall being raised from one of said flat surfaces and said fourth wall being raised from the other of said flat surfaces, said walls being concentrically arranged respectively around said first and second walls and opposed one another.

17. The cassette as defined in claim 1 wherein said cleaning liners are circular with a diameter slightly less than the diameter of said flexible disk and are coaxially disposed with respect to said flexible disk.

18. The cassette as defined in claim 1 wherein each of said lands disposed adjacent the downstream edges of said access slots contain a liner attachment groove, extending in the direction of disk rotation and overlying portions of corresponding ones of said liners are respectively fixed to said groove.

19. The cassette of claim 1 wherein said stabilization means positions said liners in selective operative contact with said disk to reduce disk flutter.

20. The cassette of claim 1 wherein said disk is a magnetic recording disk.

21. A flexible disk assembly comprising:
   a flat, flexible disk having a recording medium disposed on opposite surfaces thereof and having a central aperture surrounded by a plurality of secondary apertures;
   a hub comprising a substantially rigid circular plate and a centrally apertured, flexible ring having an adhesive surface;
   said flexible ring being disposed coaxially with respect to said disk central aperture and being coupled to one surface of said flexible disk by said adhesive surface, said ring being dimensioned to extend over said secondary apertures;
   said rigid circular plate being positioned on the opposite surface of said flexible disk coaxially with said disk central aperture and being adhesively coupled to said adhesive surface of said flexible ring through said secondary apertures so as to be retained against said said surface of said flexible disk.

22. The disk assembly as defined in claim 21 wherein said rigid circular plate includes a central hole dimensioned to accept a spindle shaft of a disk drive.

23. The disk assembly as defined in claim 22 wherein said rigid circular plate has a driving slot offset from said central hole, for accepting an offset drive pin coupled to said spindle shaft.

24. The disk assembly as defined in claim 23 wherein said driving slot includes first and second angularly spaced radially extending edges, and comprises at said first radially extending edge a ramped portion extending substantially normally to said first radially extending edge and downwardly at an angle from the exterior flat surface of said rigid circular plate, and comprises at siad second radially extending edge an abutment with which siad drive pin can engage.

25. The disk assembly of claim 21 wherein said recording medium is a magnetic recording medium.

26. Method of manufacturing a flexible disk assembly comprising the steps of:
   forming a central aperture, surrounded by a plurality of secondary apertures in a flat, flexible disk having a data recording medium disposed on opposite surfaces thereof,
   forming a hub for said disk by coaxially coupling to one surface of said disk with an adhesive layer, a centrally apertured, flexible ring, said ring and adhesive layer being dimensioned to extend over said secondary apertures, and coaxially, mounting a substantially rigid circular plate on the opposite surface of said disk, and adhesively coupling said plate to said adhesive layer through said secondary apertures so as to retain said plate against said opposite surface of said flexible disk.

* * * * *